J. J. PINK.
LIGHT SHIELD FOR MOVING PICTURE MACHINES.
APPLICATION FILED MAR. 5, 1909.
956,166.
Patented Apr. 26, 1910.
2 SHEETS—SHEET 1.
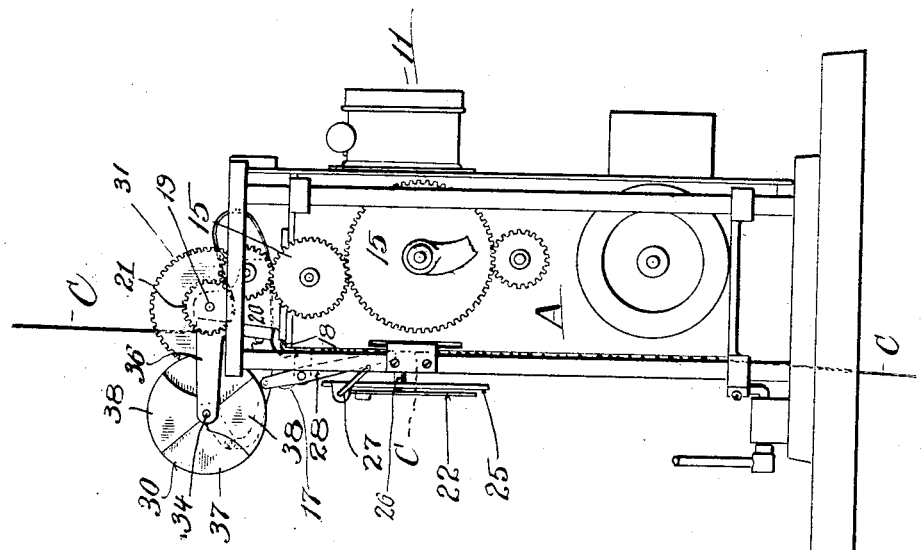
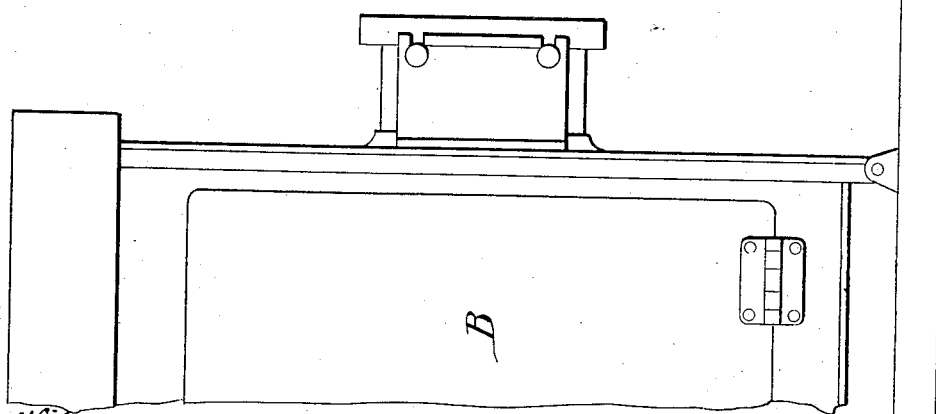
Witnesses:
Fannie F. Richards
Frank W. Benn
Inventor:
John J. Pink.
By Charles O. Shurvey
his Atty J. J. PINK.
LIGHT SHIELD FOR MOVING PICTURE MACHINES.
APPLICATION FILED MAR. 5, 1909.
956,166.
Patented Apr. 26, 1910.
2 SHEETS—SHEET 2.
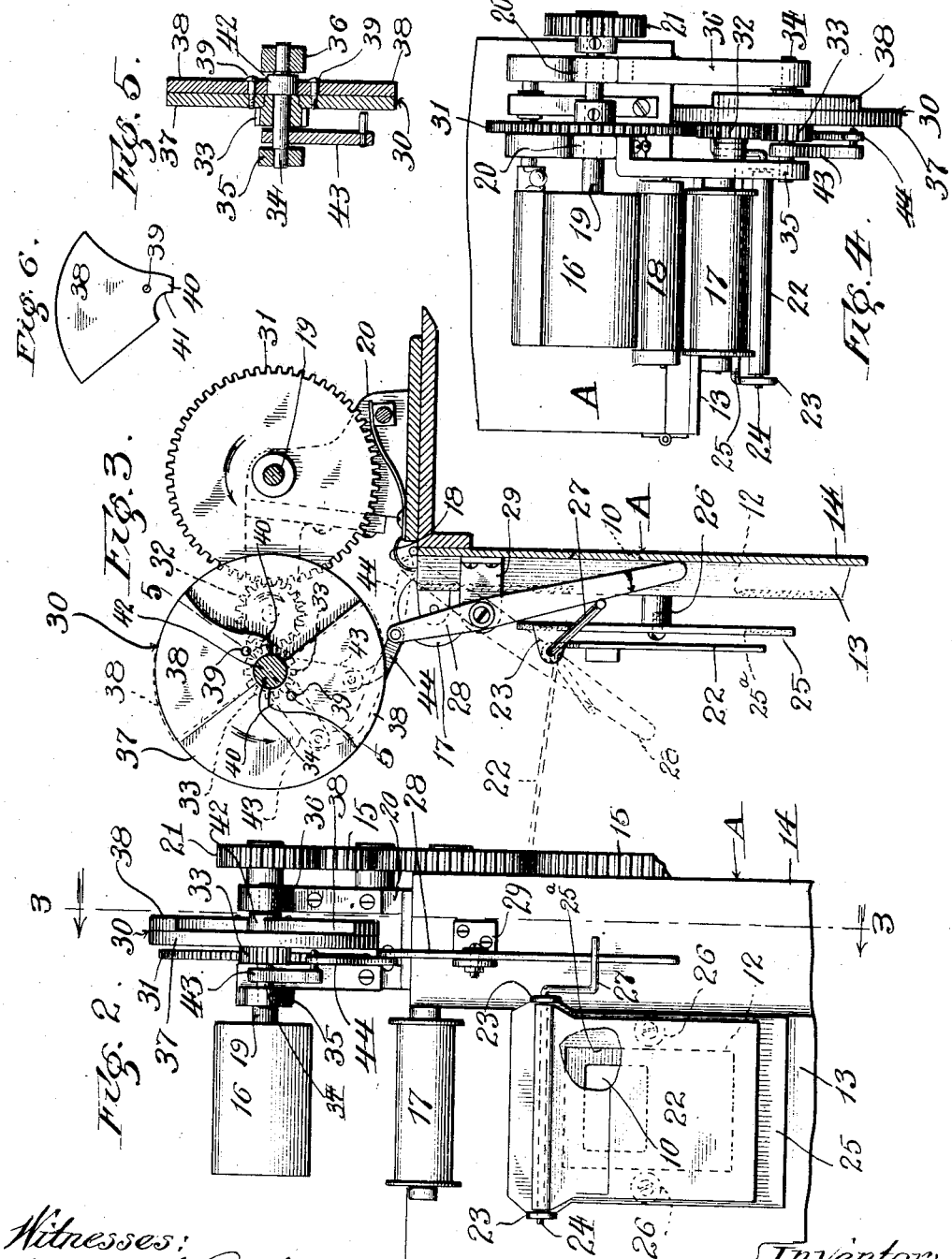
Witnesses:
Fannie F. Richards
Frank W. Benun
Inventor:
John J. Pink,
by Charles O. Shirley
his Atty

UNITED STATES PATENT OFFICE.

JOHN J. PINK, OF CHICAGO, ILLINOIS.

LIGHT-SHIELD FOR MOVING-PICTURE MACHINES.

956,166.  Specification of Letters Patent.  Patented Apr. 26, 1910.

Application filed March 5, 1909. Serial No. 481,299.

*To all whom it may concern:*

Be it known that I, JOHN J. PINK, a citizen of the United States, residing at Chicago, in the county of Cook and State of Illinois, have invented new and useful Improvements in Light-Shields for Moving-Picture Machines, of which the following is a specification.

This invention relates to light shields for moving picture machines, and has for its object to provide an automatically operated shield for intercepting the intense light rays that are used to project the pictures from the film.

The films used in moving picture machines are usually made of highly combustible material and it often happens that from some unforeseen occurrence the machine will be suddenly stopped, the intense light rays igniting the film, causing a conflagration.

It is the object of my invention to provide a light shield and a simple form of automatically operating mechanism for moving said shield out of the path of the rays of light when the machine is in running operation and for releasing the shield so that it may automatically return to its normal position when the machine is stopped, which position is that of covering up the framing aperture through which the light is projected onto the screen.

To such ends this invention consists in certain novel features of construction and arrangement, a description of which will be found in the following specification, and the essential features of which will be more definitely pointed out in the claims appended hereto.

The invention is clearly illustrated in the drawings furnished herewith in which—

Figure 1 is a side view of a simple form of moving picture machine, and a lamp, a portion of the lamp, however, being broken away to enable the view to be made as large as possible upon the sheet, Fig. 2 is a rear view of the upper portion of a moving picture machine containing my improvements, Fig. 3 is a vertical cross section taken on the line 3—3 of Fig. 2, Fig. 4 is a plan view of parts seen in Fig. 2, Fig. 5 is a detail cross section taken on the line 5—5 of Fig. 3, and Fig. 6 is a face view of a governor weight.

In these views A, represents an ordinary moving picture machine which may be operated by a crank or by means of a belt, gearing or the like, and B, represents a lamp from which the light is projected, C is the film and said film comes from a magazine, (not shown) and is threaded through the machine, passing out through the lower end and into any suitable receptacle. Machines of this type all contain a framing aperture 10, in the rear wall, and a lens 11, in the front wall through which the light passes from the lamp to the screen upon which the pictures are projected. The framing aperture 10, is preferably given such size and shape as to control the size and shape of the picture and a second light opening 12, is provided in the door or gate 13, which is usually hinged to the rear wall 14, of the machine. The film feeding mechanism of machines of this type is well known and requires no description as the invention may be employed upon any form of moving picture machine.

15, represents a train of gears, which is arranged to impart a rotary motion to the feed roller 16, for feeding the film in a continuous movement to the feeding mechanism that draws it past the light apertures.

17, 18, are idler rollers which guide the film into the channel through which it passes in its movement through the machine. The feed roller 16, is mounted upon a shaft 19, which is journaled in standards 20, secured upon the top of the machine and the outer end of said shaft 19, carries a pinion 21, which meshes with the first pinion in the train of gears 15.

The light shield is seen at 22, and as shown comprises a flat plate which is pivoted at its upper end in ears 23, by means of a rod 24. The ears extend out from a supporting plate 25, which is secured to the door or gate 13, by means of posts 26. This plate 25, also contains a light opening 25ª, corresponding in size and shape to the opening in the door. In the arrangement shown, the shield is intended to hang down immediately before the supporting plate 25, and the plate and shield are arranged in line with the light apertures 10 and 12, so that when the shield is in its normal position, the light from the lamp will be intercepted and none of it allowed to pass by the shield. A crank 27, is provided upon the end of the rod 24, by means of which the shield is operated. The shield is automatically raised out of its normal or closed position by means of operating mechanism, which will presently be described.

The crank 27, is moved from its normal position by a lever 28, which is pivoted upon a bracket 29, secured to the wall 14, of the machine. The lower arm of the lever 28, engages the crank and when moved in the direction indicated by the arrow in Fig. 3 to a sufficient distance, swings the crank upon its pivot thereby swinging the shield up into the position indicated by dotted lines and exposing the light apertures and film to the rays of light from the lamp.

The operating lever is actuated by a governor 30, which receives its movement indirectly from one of the revolving shafts of the machine here shown as the feed roller shaft 19. As shown, said shaft 19, has secured upon it a gear wheel 31, which meshes with a pinion 32, and said pinion 32, in turn meshes with a pinion 33, which is loosely mounted upon a shaft 34, journaled in the ends of arms 35, 36, which are secured to the standards 20. The pinion 32, is journaled upon a stud which extends out from the arm 35, and the pinion 33, is connected with a circular disk 37, which forms part of the governor and is also loosely mounted upon the shaft 34. The pinion 33, and plate 37, may be formed integral with each other or they may be separate elements and secured together in a suitable manner. Two governor weights 38, 38, are pivoted upon the disk 37, at 39, 39, and contain shoulders 40, which are formed with bearing faces 41, adapted to bear against the shaft 34, and in the preferred form of construction, said shaft 34, is formed with an enlarged cylindrical portion 42, upon which the bearing faces 41, of the shoulders 40, are adapted to impinge. It is evident that when the disk is rotated at a high rate of speed the weights 38, will be thrown outward upon their pivots by reason of the centrifugal force, thereby causing the bearing faces of the shouldered portions of the weights to impinge upon the enlargement 42, of the shaft 34, and frictionally couple it with the disk, the result being that the shaft 34, is caused to turn. A crank arm 43, is secured upon the shaft 34, and said arm is connected with the upper end of the lever 28, as by a link 44. It will be understood that whenever the shaft 34, is turned by the governor, the arm 43, will be moved in unison therewith, and by reason of its connection with the lever 28, will swing said lever from the position shown in solid lines in Fig. 3 to that illustrated in dotted lines, whereupon the lever strikes a stop and its movement is stopped. In the construction shown the upper end of the lever strikes the wall 14, which acts as a stop therefor. A continuous rotation of the governor at a high rate of speed will maintain the parts in such position but in case the operating mechanism of the machine is stopped for any reason, the governor will stop running, its grip upon the shaft 34, will be released and the shield 22, will fall by reason of its own gravity, into a vertical position where it shuts off the light from the lamp.

I am aware that various alterations and modifications of the details of the construction are possible without departing from the spirit of my invention, and I do not therefore desire to limit myself to the exact construction shown and described.

I claim as new and desire to secure by Letters Patent:

1. The combination with a rotary shaft of a moving picture machine, of a second shaft, an arm carried thereby, a governor disk loosely mounted upon said second named shaft, gearing between the governor and first named shaft, a governor weight arranged to frictionally connect the second named shaft with the governor disk whenever said disk is rotated at a high rate of speed, a light shield and connections between the light shield and arm.

2. The combination with a rotary shaft of a moving picture machine, of a second shaft, a crank arm secured to said second named shaft, a governor disk loosely mounted upon said second named shaft and carrying a pinion, gearing between said pinion and first named shaft, governor weights pivoted to the governor disk and arranged to frictionally connect the second named shaft with the governor disk whenever the disk is revolved at a high rate of speed, a light shield hinged before the light aperture of the moving picture machine, a rocking lever arranged to move the light shield out of its closed position and a connection between the rocking lever and crank arm.

3. The combination with a rotary shaft of a moving picture machine, of a second shaft, a pinion loosely mounted thereon, gearing between said pinion and first named shaft, a governor operated by said pinion and arranged to frictionally connect the second named shaft with the pinion whenever the governor is revolved at a high rate of speed, a crank arm upon said second named shaft, a rocking lever connected with said crank arm and a light shield operated by said rocking lever.

4. The combination with a rotary shaft of a moving picture machine having a gear wheel secured thereto, of a second shaft having a pinion loosely mounted thereon, and geared to the gear wheel upon the first named shaft, a governor connected to said pinion and operating to turn said second named shaft whenever rotated at a high rate of speed, an arm upon said second named shaft, a light shield and connections between the arm and light shield.

5. The combination with a rotary shaft of a moving picture machine, of a second shaft, a governor loosely journaled on said second named shaft and having a pinion geared to the first named shaft, said governor operating to clutch the second named shaft to itself when revolved at a high rate of speed, an arm upon the second named shaft, a light shield pivoted before the light aperture of the moving picture machine, an oscillating lever and connections between the oscillating lever and crank arm and between the oscillating lever and light shield.

6. The combination with a rotary shaft of a moving picture machine. of a second shaft, a governor disk loosely mounted thereon and carrying a pinion geared to the first named shaft, governor weights pivoted to said disk and arranged to impinge upon the second named shaft whenever the disk is revolved at a high rate of speed, a crank arm upon said second named shaft, a light shield pivoted before the light aperture of the moving picture machine and connections between the crank arm, and light shield arranged to move said shield out of closed position whenever the second named shaft is turned.

7. The combination with a rotary shaft of a moving picture machine, of a second shaft, a governor carried thereby and geared to the first named shaft, said governor being arranged to couple the second named shaft with itself whenever it is run at a high rate of speed, a crank arm upon said second named shaft, a light shield pivoted before the light aperture of the moving picture machine and arranged to move to a closed position by gravity alone and means connected with the crank arm for raising said light shield out of closed position whenever the second named shaft is turned.

8. The combination with a rotary shaft of a moving picture machine, of a second shaft, a governor disk loosely mounted on said second named shaft and having a pinion geared to the first named shaft, governor weights pivoted to said disk and having bearing surfaces adapted to engage with the second named shaft, a crank arm mounted upon said second named shaft, an oscillating lever, a link between said lever and crank arm, a light shield pivoted before the light aperture of the moving picture machine and having a crank arm extending into the path of the operating lever.

In witness whereof, I have subscribed my name to the foregoing specification, at Chicago, Cook county, Illinois, this 24th day of February A. D. 1909.

JOHN J. PINK.

Witnesses:
 CHARLES O. SHERVEY,
 FANNIE F. RICHARDS.